: 3,364,135
Patented Jan. 16, 1968

3,364,135
HYDROCARBON CONVERSION PROCESS AND CATALYST COMPRISING A Y TYPE CRYSTALLINE ALUMINOSILICATE PROMOTED WITH A POLYVALENT METAL
Rowland C. Hansford, Yorba Linda, Calif., assignor to Union Oil Company of California, Los Angeles, Calif., a corporation of California
No Drawing. Continuation-in-part of application Ser. No. 150,129, Nov. 6, 1961. This application Dec. 17, 1962, Ser. No. 244,918
10 Claims. (Cl. 208—120)

This application is a continuation-in-part of application Serial No. 150,129, filed November 6, 1961, now abandoned.

This invention relates to new catalysts for hydrocarbon conversions, and to hydrocarbon conversion processes such as hydrocracking or isomerization, employing such catalysts. The new catalysts comprise as their essential active component a protonated molecular sieve zeolite (or "hydrogen" zeolite) of the Y crystal type, a portion of the zeolitic ion-exchange sites being combined with certain divalent metals in order to provide catalysts of improved hydrothermal stability. The invention is particularly concerned with the manufacture of Y sieve hydrogen zeolites which, by virtue of their low sodium content and improved hydrothermal stability, are particularly useful as hydrocracking and isomerization catalyst bases.

Briefly stated, the protonated zeolite catalyst bases of this invention are molecular sieves of the Y crystal type wherein at least about 10% of the ion-exchange capacity is satisfied by divalent metal ions such as magnesium, at least about 20% by hydrogen ions, and less than about 20% by sodium ions.

To prepare these divalent metal-hydrogen zeolites the preferred procedure is as follows: The initial sodium Y zeolite (which may be prepared by conventional methods) is first converted to a low-sodium, ammonium zeolite by ion exchange with an ammonium salt solution; the ammonium zeolite is then partially back-exchanged with a solution of the desired divalent metal salt, and the resulting divalent metal-ammonium zeolite is then calcined to decompose ammonium ions and produce the divalent metal-hydrogen zeolite. For most purposes, it is also desirable to incorporate a small proportion of a Group VIII metal hydrogenating component, preferably by ion exchange into the ammonium zeolite, and the final calcined compositions are then useful as catalysts for hydrocracking, isomerization, etc.

It has recently been discovered that certain zeolitic molecular sieves of the Y crystal type, in their ammonium form, can be heated at relatively high temperatures to decompose the ammonium ion, and that the resulting hydrogen zeolites (which are often referred to as being "decationized") still exhibit a high degree of crystallinity and surface area, and have a relatively high acidity. These characteristics are in sharp contrast to the results obtained when other molecular sieve zeolites are similarly treated to form hydrogen zeolites; in the case of these other zeolites, e.g., zeolites of the X crystal type, the attempted conversion of the ammonium zeolite to a hydrogen zeolite results in a complete collapse of the crystal structure with resultant marked decrease in surface area.

As a result of their high acidity and surface area, the hydrogen zeolites of the Y crystal type have been found to be very useful as bases for catalysts to be employed in reactions such as hydrocracking or isomerization, which require a combination of a highly acid base with a hydrogenating component such as palladium, platinum or nickel.

One of the difficulties which has been encountered in using catalysts based on hydrogen Y zeolites resides in their relatively poor hydrothermal stability, i.e., their ability to retain crystallinity and surface area after contact with water vapor at high temperatures. Any substantial loss in surface area results in a corresponding decrease in catalytic activity. In the case of catalysts prepared from conventional hydrogen Y zeolites, wherein the sodium content ($Na_2O$) is less than about 3% by weight, it is often observed that there is an almost complete collapse of crystal structure upon hydration of the catalyst, followed by heating to drive off the water. The collapse in crystal structure is often accompanied by a decrease in surface area from figures in the neighborhood of 800–1,100 square meters per gram down to 20–100 square meters per gram. Losses in surface area of this magnitude are substantially fatal to continued catalytic activity.

Hydrothermal stability of catalysts is important in substantially any hydrocarbon conversion process, and particularly in processes where the catalyst is periodically regenerated by combustion of deactivating deposits. In conversion processes such as hydrocracking or isomerization, the catalyst may be inadvertently contacted with water, as by water-contaminated feedstocks or hydrogen supply, etc. Also, in the shipping of the catalyst, and loading of catalytic reactors, it is substantially impossible to avoid contacting the catalyst with moist air, and where the catalyst rapidly adsorbs water as in the present case, it may be in a substantially hydrated condition by the time it is loaded in the reactor. This water is subsequently desorbed during the heat-up or reaction period, and it is during this period that the greatest damage may occur. During regeneration, the catalyst is subjected to oxidation with oxygen-containing gases at relatively high temperatures of, e.g., 800–1,200° F., and since the combustible deposits on the catalyst normally include hydrocarbons, a considerable amount of water is generated by oxidation. Also, the input regeneration gases normally contain substantial amounts of water, unless expensive drying techniques are employed. It is obvious therefore, that in nearly any commercial use of solid catalysts, it is important that they exhibit a high degree of hydrothermal stability.

It is known that a considerably higher degree of hydrothermal stability can be obtained in the case of hydrogen Y zeolites by only partially exchanging the sodium with ammonium ion, and then decomposing the sodium-ammonium zeolite to form a sodium-hydrogen zeolite containing, e.g., about 4–6% by weight of $Na_2O$. (As initially prepared, the sodium Y zeolite contains about 13–15% by weight of $Na_2O$.) However, although improved hydrothermal stability can be obtained by this means, it is found that when more than about 3% by weight of $Na_2O$ remains in the zeolite, the catalytic activity suffers greatly, and some loss in activity occurs when the $Na_2O$ content is greater than about 1%. Apparently, sodium in amounts greater than about 1–1.5%, tends to neutralize the active acidic centers on the catalyst. It would therefore be highly desirable to provide methods for maintaining hydrothermal stability in those hydrogen zeolite compositions containing less than about 3%, and preferably less than 1.5%, by weight of $Na_2O$.

It is also known that the deleterious effects of sodium in the catalyst bases can be overcome to some extent by partially exchanging the sodium zeolites with certain less basic metals such as magnesium, calcium, etc. (Only partial exchange can here be achieved, due to the difficulty of obtaining complete exchange of monovalent sodium for a divalent metal.) The resulting sodium-divalent metal zeolites are considerably more stable hydrothermally than the hydrogen zeolites. However, in the resulting zeolites, protonated exchange sites are lacking, and as a result catalytic activity is substantially lowered.

Thus, the magnesium zeolites, while being quite stable hydrothermally, normally require temperatures about 50–100° F. higher than the corresponding hydrogen zeolites for the same conversion. It would be highly desirable to provide a zeolite catalyst base having the stability of the magnesium zeolite, and the activity of the hydrogen zeolite. The catalysts of this invention, to a substantial extent, have achieved this objective.

In their sodium form, the general formula for the Y molecular sieve zeolites of this invention is expressed as follows:

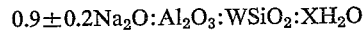

$$0.9 \pm 0.2 Na_2O : Al_2O_3 : WSiO_2 : XH_2O$$

where X=0 to about 9, and W=2.5 to about 6. Sodium zeolites of this nature, and methods for their preparation are described in Belgian Patent Nos. 577,642, 598,582, 598,682, 598,683 and 598,686. The Y sieve zeolites having a $SiO_2/Al_2O_3$ mole-ratio of about 2.5 to 3.9 can be prepared by methods described in Belgian Patent No. 577,642, which in general involves digesting aqueous solutions of sodium silicate and sodium aluminate at elevated temperatures, following an initial low-temperature aging treatment. A more desirable form of the Y zeolite, having a $SiO_2/Al_2O_3$ mole-ratio of about 4 to 6, can be prepared by methods described in Belgian Patent No. 598,582, which involves essentially an initial, low-temperature aging of a mixture of silica hydrosol, sodium hydroxide and sodium aluminate, followed by a high-temperature digestion to effect crystallization of the sodium zeolite. Sodium zeolites prepared by either of these methods can be converted to crystalline hydrogen zeolites by ammonium ion-exchange followed by heating, although the high-silica type of zeolite is generally more stable in its hydrogen form than the hydrogen zeolites prepared from the low-silica zeolites. In either case however, the resulting hydrogen zeolites are deficient in hydrothermal stability, even though the initial preparations may exhibit a high degree of crystallinity and surface area.

There are at least two different procedures by which the foregoing sodium zeolites can be converted to the divalent metal-hydrogen zeolites of this invention:

*Method 1.*—The sodium zeolite is subjected to ion exchange with an aqueous solution containing both a salt of the desired divalent metal and a soluble ammonium salt, whereby simultaneous replacement of sodium with divalent metal and ammonium ion occurs, followed by heating to decompose the ammonium ion.

*Method 2.*—The sodium zeolite is first subjected to ion exchange with an aqueous solution of a soluble ammonium salt in order to replace about 80–100% of the sodium with ammonium ion, followed by a partial back-exchange of the zeolitic ammonium ions for the desired divalent metal, followed by heating to decompose the remaining ammonium ions.

The second of these methods is preferred. Method 1 is not preferred because, firstly, it is difficult to maintain control over the relative proportions of divalent metal, sodium, and the hydrogen ions in the final composition. In the preferred method, it is a relatively simple matter to replace 90–99% of the sodium ions with ammonium during the initial ion-exchange step. There is thus assured a final composition having an extremely low sodium content. In the back-exchange step with divalent metal salt, it is also easy to control the degree of displacement of ammonium ion with divalent metal ion. Finally, for reasons which are incompletely understood, it is found that the second method generally yields a more stable and active catalyst than the first method, even where the final compositions contain the same zeolitic ion distribution. Following is a more detailed description of this preferred method of manufacture:

*Ammonium ion-exchange step.*—The essential feature involves simply contacting the sodium zeolite with an aqueous solution of substantially any soluble ammonium salt. Preferred salts are ammonium chloride, ammonium nitrate, ammonium acetate, ammonium sulfate and the like. However other salts may be employed, including substituted ammonium salts such as methyl ammonium chloride. Procedurally, the ion-exchange can be carried out either continuously or batch-wise, using aqueous solutions of ammonium salts of, e.g., 1–20 molar concentration, preferably at elevated temperatures of about 50–100° C. In continuous operations the ammonium salt solution is percolated through a bed of the sodium zeolite until the desired degree of ion-exchange has taken place. In batch operations it is preferable to employ several stages, wherein the sodium zeolite is first digested with a batch of ammonium salt solution, then filtered off and contacted with a fresh ammonium salt solution. Ordinarily about 3–6 stages of contacting are desirable.

In any case, the ammonium ion exchange is terminated when the $Na_2O$ content of the zeolite has been reduced to below about 3% by weight, and preferably to between about 0 and 1.5%. This means that more than about 80% of the zeolitic sodium, and preferably at least about 90%, should be replaced with ammonium ion. The subsequent addition of stabilizing divalent metal eliminates the need for leaving any sodium in the product. After filtering and washing with water, the ammonium zeolite is then ready for the partial back-exchange treatment with divalent metal salt.

*Divalent metal back-exchange step.*—This step may be carried out in substantially the same manner as the preceding ammonium exchange step, merely replacing the ammonium salt with the desired divalent metal salt. Here again, substantially any soluble salt of the desired divalent metal may be used, e.g., chlorides, nitrates, sulfates, acetates, etc. Suitable divalent metals are in general those which form difficultly reducible oxides, and particularly the metals of Groups IIA and IIB, as well as manganese. The preferred metals are magnesium, zinc, manganese, calcium, beryllium and cadmium.

The optimum proportion of divalent metal to be incorporated into the zeolite varies with the particular metal. In general, the more basic metals such as calcium and strontium are used in relatively small proportions, while amphoteric metals such as zinc are used in larger proportions, and metals of intermediate basicity such as magnesium are used in intermediate proportions. On the basis of relative proportions of total ion-exchange capacity satisfied by the respective cations (cation-charge ratio) it is preferred that the zeolitic ion distribution fall within the following ranges for the various divalent metals:

TABLE 1

| Zeolite | Zeolitic Cation-Charge Ratios (Percent of Total Ion-Exchange Capacity) | | |
|---|---|---|---|
| | Divalent metal | Ammonium | Sodium |
| $NH_4$-Magnesium | 20–70 | 30–80 | 0–20 |
| $NH_4$-Calcium | 10–40 | 60–90 | 0–20 |
| $NH_4$-Zinc | 20–80 | 20–80 | 0–20 |
| $NH_4$-Beryllium | 10–90 | 10–90 | 0–20 |
| $NH_4$-Cadmium | 10–60 | 20–80 | 0–20 |

The respective weight-proportions of divalent metal can be readily calculated by stoichiometry, assuming that the total ion-exchange capacity of the zeolite concerned was satisfied by the initial sodium content, and that each divalent metal occupies two ion-exchange sites.

The invention is not intended to be limited to catalysts wherein the zeolitic cation ratios fall within the above ranges. Any degree of back-exchange of the ammonium zeolite with any of the specified divalent metals will effect some degree of stabilization, and any such useful result is intended to be included herein.

Following the back-exchange step, the resulting zeolite is filtered off, washed, dried and calcined to produce the desired divalent metal-stabilized hydrogen zeolite. The resulting products are useful as such as catalysts for cracking, isomerization, and other acid-catalyzed reactions, as well as absorbents for separating mixtures of organic compounds. In some cases, as where zinc or manganese is employed as the stabilizing divalent metal, there will be sufficient hydrogenating activity contributed thereby to form active hydrogenation and/or hydrocracking catalysts, without further addition of hydrogenating metals. However, in most cases where a hydrogenating function is desired, as in hydrocracking catalysts, it is preferable to add a small proportion of one or more of the Group VIII metals, preferably a Group VIII noble metal. Specifically, it is preferred to employ about 0.1% to 3% by weight of palladium, platinum, rhodium, ruthenium or iridium. These Group VIII metals may be added by impregnation of the calcined hydrogen zeolite, but preferably they are formed by ion-exchange prior to, during, or directly after the divalent metal back-exchange step, i.e., before the ammonium zeolite is decomposed to form the hydrogen zeolite.

To incorporate the Group VIII metals by ion exchange, the divalent metal-ammonium zeolite, still in a hydrous form, is digested with an aqueous solution of a suitable compound of the desired metal wherein the metal is present in a cationic form. Preferably, fairly dilute solutions of the Group VIII metal salts are employed, and it can be assumed that there will be a substantially quantitative exchange of ammonium ion for the Group VIII metal. This ion-exchange procedure is described more specifically in Belgian Patent No. 598,686. The exchanged metal-ammonium zeolite is then filtered off, washed, dried and calcined in order to convert the remaining ammonium ions to hydrogen ions. The resulting catalyst powders are then pelleted in the usual manner.

Table 2 below lists several exemplary catalysts contemplated herein, and which can be prepared by the methods described above. In each case, the catalysts are derived from an original sodium Y sieve zeolite prepared in the conventional manner from silica hydrosol, sodium aluminate and sodium hydroxide, the resulting sodium zeolite having a $SiO_2/Al_2O_3$ mole-ratio of about 4.7, and containing about 14% by weight of $Na_2O$.

TABLE 2

| Catalyst No. | Divalent Metal, weight/percent | $Na_2O$, weight percent | Percent of Exchange Sites Protonated | Hydrogenating, Metal, weight percent |
|---|---|---|---|---|
| 1 | MgO, 3.7 | 1.2 | 50 | Pd, 0.5. |
| 2 | MgO, 2.8 | 1.2 | 60 | Pt, 0.5. |
| 3 | MgO, 2.8 | 1.2 | 40 | Ni, 4.0. |
| 4 | CaO, 2.5 | 1.2 | 70 | Pd, 0.5. |
| 5 | ZnO, 11 | 1.2 | 30 | Pd, 0.5. |
| 6 | ZnO, 13 | 1.2 | 20 | Pt, 0.5. |
| 7 | BeO, 2.2 | 1.2 | 50 | Pd, 0.5. |
| 8 | CdO, 5.8 | 1.2 | 70 | Rh, 0.4. |
| 9 | MnO, 8.0 | 1.2 | 40 | Pd, 0.5. |

Activation to convert the ammonium zeolites to hydrogen zeolites is ordinarily accomplished by calcining the catalysts at about 700–900° F. for about 0.5 to 12 hours. Compositions prepared in this manner ordinarily display an initial surface area in the range of about 700–1,100 square meters per gram.

Hydrothermal stability of the catalysts of this invention is measured by rehydrating the catalysts in moist air at room temperature until they are substantially saturated, and then recalcining for 12 hours at 900° F. Surface area is then measured again, and the difference between the initial surface area and the area after recalcining is taken as a measure of hydrothermal stability.

The finished catalysts are useful for the hydrocracking of mineral oil fractions boiling between about 300–1,000° F., to produce desired lower boiling hydrocarbons, e.g., gasoline, jet fuel, etc. Suitable hydrocracking conditions for catalyst compositions containing about 0.2 to 1% by weight of palladium or platinum, fall within the following ranges:

TABLE 3

| | Operative | Preferred |
|---|---|---|
| Temperature, ° F | 400–850 | 500–750 |
| Pressure, p.s.i.g | 300–5,000 | 750–2,000 |
| LHSV | 0.1–10 | 0.5–0 |
| $H_2$/oil ratio, s.c.f./b | 1,000–20,000 | 2,000–12,005 |

The following examples are cited to illustrate the invention, but are not to be construed as limiting in scope:

EXAMPLE I

This example illustrates in detail the preparation of one of the optimum catalysts of this invention.

(A) *Preparation of sodium zeolite.*—Into a large vessel containing 9,520 ml. of distilled water is stirred 750 grams of Nalco No. 680 sodium aluminate. To this solution is then added 1,940 grams of sodium hydroxide and the solution is allowed to cool to 70° F. About 13,600 grams of colloidal silica hydrosol (Ludox—about 30.0 weight-percent $SiO_2$), is then added rapidly while stirring vigorously. The resulting slurry is then set aside to age at room temperature for about 24 hours. The mole-ratios of reactants in the mixture are as follows:

$Na_2O/SiO_2$ ---------------------------------- 0.42
$SiO_2/Al_2O_3$ ---------------------------------- 20
$H_2O/Na_2O$ ---------------------------------- 38

At the end of the 24-hour aging period, the mixture is then heated to about 200–205° F., maintained at that temperature for about 48 hours during which crystallization of the sodium zeolite occurs. The resulting slurry is then filtered, washed with hot water and air dried. The resulting composition contains about 14 weight-percent $Na_2O$ on a dry basis, and has a $SiO_2/Al_2O_3$ mole-ratio of about 4.7.

(B) *Ammonium ion-exchange.*—The hydrated sodium zeolite from part (A) is stirred and heated for about 1 hour at 90° C. with a 27% ammonium chloride solution in water, the proportions being such as to provide 75 grams of ammonium chloride in 200 ml. of water for each 100 grams of anhydrous sodium zeolite. The slurry is then filtered and the filter cake washed with hot water. This ion-exchange procedure is then repeated four more times, and the resulting ammonium zeolite is then found to contain 1.4 weight-percent of $Na_2O$, indicating that about 90% of the original sodium had been replaced with ammonium ions.

(C) *Back-exchange with magnesium sulfate.*—About 550 grams of the wet ammonium zeolite from part (B) is slurried in 500 ml. of distilled water, and to the resulting slurry is added slowly a solution of 76.5 grams of $MgSO_4 \cdot 7H_2O$ in 300 ml. of distilled water. Stirring is continued for about 1 hour, and the mixture is then filtered and the filter cake washed with water. At this point the zeolite is about 20% back-exchanged with magnesium. About 339 grams of this wet material is then again dispersed in 500 ml. of distilled water, and to the slurry is added 66.6 grams of $MgSO_4 \cdot 7H_2O$ dissolved in 300 ml. of water, followed by stirring for another hour. Upon filtration and washing, the final product is found to be about 32% back-exchanged (about 3 weight-percent MgO on a dry basis).

(D) *Addition of palladium.*—The wet magnesium-ammonium zeolite from part (C) is slurried with about an equal weight of water. Then a solution of tetramine palladium chloride, containing the stoichiometric amount of palladium calculated to provide 0.5 weight-percent palladium in the final product, is added very slowly with constant stirring. Absorption of palladium from this solution is substantially quantitative. The slurry is then filtered, and the filter cake washed with distilled water.

(E) *Pelleting of catalyst.*—The wet filter cake from (D) is dried to about 15–25% water content at 250° F., granulated through a 20-mesh screen, mixed with about 1% of hydrogenated corn oil powder, and pelleted in a pellet press.

(F) *Activation of catalyst.*—The pellets from step (E) are gradually heated to about 900° F. during about 4 hours and held at this temperature for 12 hours to remove water and to decompose the ammonium ions, whereupon there is obtained a final catalyst composition containing 0.5 weight-percent palladium, 1.4 weight-percent $Na_2O$, and about 3 weight-percent MgO. This catalyst has excellent hydrothermal stability, and is substantially equal in hydrocracking activity to a corresponding hydrogen zeolite catalyst prepared in the same manner except for omission of the magnesium back-exchange step (C).

EXAMPLE II

In order to demonstrate the critical stabilizing effect of the divalent metal, a series of five magnesium-stabilized catalysts were prepared essentially as described in Example I. Each catalyst was a Y molecular sieve zeolite containing 0.5 weight-percent of zeolitic palladium, the remaining ion-exchange capacity being satisfied by magnesium ions, hydrogen ions and sodium ions in varying ratios produced by varying the degree of back-exchange of the ammonium zeolite with magnesium. After the final calcining to convert ammonium ions to hydrogen ions, the surface area of each catalyst was measured by a nitrogen adsorption technique at a relative pressure of about 0.02. Then samples of each catalyst were substantially completely hydrated (20–25% by weight $H_2O$) in moist air, recalcined for 12 hours at 900° F. and surface areas again determined. Finally, the rehydration-recalcination-surface area measurement sequence was repeated a second time, and the final results were as follows:

The feed was hydrocracked over each catalyst at 1,000 p.s.i.g., 1.5 LHSV, 8,000 s.c.f. $H_2$/B feed, and at temperatures adjusted to give 50% conversion to 400° F. end-point gasoline per pass. The hydrocracking temperature is thus inversely proportional to catalyst activity. The results were as follows:

TABLE 5

| Catalyst No. | Zeolitic Cation-Charge Distribution | | | Temperature (° F.) for 50% conversion after— | | |
|---|---|---|---|---|---|---|
| | Mg | H | Na | 25 hrs. | 50 hrs. | 75 hrs. |
| 1 | 0 | 90 | 10 | 570 | 586 | |
| 3 | 35 | 55 | 10 | 540 | 549 | 549 |
| 5 | 79 | 13 | 8 | 555 | 568 | 568 |

Catalysts 3 and 5 thus appear to be more active than the pure hydrogen catalyst 1. This however is believed to be due to some slight hydrolytic damage to catalyst No. 1, which is unstable. In the absence of hydrolytic damage, the pure hydrogen zeolite catalyst shows substantially the same activity as catalyst No. 3, which contains an optimum proportion of magnesium. Catalyst No. 5 is very stable, but is less active due to its relative deficiency in protonated exchange sites.

EXAMPLE IV

To illustrate the deleterious effects of sodium in the catalysts, a series of three hydrogen Y sieve catalysts, each containing 0.5% Pd and varying amounts of sodium, were compared for hydrocracking activity, using a feed and conditions similar to those of Example III, except that the pressure was 1,500 p.s.i.g. and the space velocity 1.0. The temperatures required for 50% conversion to gasoline were as follows:

TABLE 4

| Catalyst No. | Zeolitic Cation-Charge Distribution [a] | | | Surface Area, M.²/g. | | | | |
|---|---|---|---|---|---|---|---|---|
| | Mg | H | Na | Initial | One Hydration | Percent Drop [b] | Two Hydrations | Percent Drop [b] |
| 1 | 0 | 90 | 10 | 751 | 214 | 72 | 43 | 94 |
| 2 | 20 | 70 | 10 | 744 | 274 | 63 | 181 | 76 |
| 3 | 35 | 55 | 10 | 792 | 582 | 27 | 537 | 32 |
| 4 | 55 | 37 | 8 | 744 | 710 | 5 | 673 | 10 |
| 5 | 79 | 13 | 8 | 692 | 632 | 9 | 632 | 9 |

[a] Percent of total exchange capacity.
[b] Percent drop from initial surface area.

It is thus apparent that, for acceptable stability, at least about 20%, and preferably at least about 35%, of the total ion exchange capacity should be satisfied with magnesium. Lesser amounts of magnesium are adequate however when more than 10% of the zeolitic sodium is allowed to remain in the catalyst.

EXAMPLE III

This example illustrates a hydrocracking process using the catalysts of Example II, and also provides a comparison of relative activities.

Three hydrocracking runs were performed using catalysts 1, 3 and 5 of Example II. The feed was a hydrogenated gas oil having the following characteristics:

Gravity, ° API _____ 33.0
Boiling range, ° F. _____ 440–830
Nitrogen, p.p.m. _____ 7
Sulfur, p.p.m. _____ 11
Vol. percent aromatics _____ 27

TABLE 6

| Catalyst No. | Zeolitic Cation-Charge Distribution | | Temperature (° F.) for 50% Conversion After 50 hrs. |
|---|---|---|---|
| | H | Na | |
| 6 | 93 | 7 | 509 |
| 7 | 86 | 14 | 528 |
| 8 | 79 | 21 | 540 |

At higher sodium levels the activity drops off even more precipitously.

It is not intended that the invention should be limited to the details described above since many variations may be made by those skilled in the art without departing from the scope or spirit of the following claims:

I claim:
1. In a hydrocarbon conversion process wherein a hy- drocarbon feedstock is contacted with a solid catalyst under conversion conditions including a temperature between about 400° and 850° F., and wherein significant amounts of water vapor come into contact with said catalyst at least periodically during said process, the improved method for obtaining high catalyst activity with minimum hydrothermal deactivation from said water vapor, which comprises utilizing as the catalyst in said process a composition comprising as the essential active component a crystalline, alumino-silicate zeolite of the Y crystal type wherein at least about 20% of the ion-exchange capacity thereof is satisfied by hydrogen ions, at least about 20% by divalent metal ions selected from the class consisting of the Group II–A metals, the Group II–B metals and manganese, and wherein less than about 20% of said ion-exchange capacity is satisfied by alkali metal ions, said zeolite component, when in its pure hydrogen form, being unstable in crystal structure under the above recited conversion conditions in the presence of said significant amounts of water vapor.

2. A process as defined in claim 1 wherein said divalent metal is magnesium.

3. A process as defined in claim 1 wherein said divalent metal is zinc.

4. A process as defined in claim 1 wherein less than about 10% of the zeolitic ion-exchange capacity of said catalyst is satisfied by alkali metal ions, and more than about 20% is satisfied by said divalent metal ions.

5. A process as defined in claim 1 wherein said hydrocarbon conversion is catalytic hydrocracking, carried out in the presence of added hydrogen at elevated pressures, and wherein said catalyst contains a minor proportion of a Group VIII metal hydrogenating component.

6. A process as defined in claim 5 wherein said divalent metal is magnesium.

7. A process as defined in claim 5 wherein less than about 10% of the zeolitic ion-exchange capacity of said catalyst is satisfied by alkali metal ions, and more than about 20% is satisfied by said divalent metal ions.

8. A process as defined in claim 5 wherein said Group VIII metal is palladium.

9. A hydrocarbon conversion catalyst adapted for use at elevated temperatures in the presence of water vapor, comprising a minor proportion of a Group VIII noble metal supported on a Y moleculer sieve zeolite base containing less than about 3% by weight of $Na_2O$ and wherein 20–70% of the zeolitic ion-exchange capacity thereof is satisfied by magnesium ions, and 30–80% by hydrogen ions.

10. A catalyst as defined in claim 9 wherein said Group VIII noble metal is palladium.

References Cited

UNITED STATES PATENTS

| | | | |
|---|---|---|---|
| 3,236,761 | 2/1966 | Rabo et al. | 208—111 |
| 3,236,762 | 2/1966 | Rabo et al. | 208—111 |
| 3,130,006 | 4/1964 | Rabo et al. | 23—110 |
| 3,140,251 | 7/1964 | Plank et al. | 208—120 |
| 3,140,253 | 7/1964 | Plank et al. | 208—120 |
| 3,132,087 | 5/1964 | Kelley et al. | 208—59 |
| 2,971,904 | 2/1961 | Gladrow et al. | 208—135 |
| 2,983,670 | 5/1961 | Seubold | 208—110 |
| 3,130,007 | 4/1964 | Breck | 23—113 |

FOREIGN PATENTS 1,098,929   9/1961   Germany.

ABRAHAM RIMENS, *Primary Examiner.*

DANIEL WYMAN, ALPHONSO SULLIVAN, PAUL M. COUGHLAN, DELBERT E. GANTZ, *Examiners.*